(12) United States Patent
Barroso et al.

(10) Patent No.: US 10,956,407 B2
(45) Date of Patent: Mar. 23, 2021

(54) AUTOMATIC DETECTION OF PROBLEMS IN A LARGE-SCALE MULTI-RECORD UPDATE SYSTEM AND METHOD

(71) Applicant: International Business Machines Corporation, Armonk, NY (US)

(72) Inventors: Filipe J. Barroso, Medford, MA (US); Judith H. Cass, Hudson, MA (US); Marlin R. Deckert, San Jose, CA (US); Michael J. Saylor, Carlisle, MA (US); Adam Skwersky, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 16/171,623

(22) Filed: Oct. 26, 2018

(65) Prior Publication Data

US 2019/0073364 A1   Mar. 7, 2019

Related U.S. Application Data

(63) Continuation of application No. 14/701,845, filed on May 1, 2015, now Pat. No. 10,180,957, which is a continuation of application No. 14/459,664, filed on Aug. 14, 2014, now Pat. No. 10,204,134.

(51) Int. Cl.
*G06F 16/23* (2019.01)
(52) U.S. Cl.
CPC ...... *G06F 16/2386* (2019.01); *G06F 16/2358* (2019.01)

(58) Field of Classification Search
CPC .................. G06F 16/2386; G06F 16/2358
USPC ......................................................... 707/691
See application file for complete search history.

(56) References Cited

U.S. PATENT DOCUMENTS

| 5,710,901 | A | 1/1998 | Stodghill |
| 5,982,890 | A | 11/1999 | Akatsu |
| 6,055,519 | A | 4/2000 | Kennedy |
| 6,189,016 | B1 | 2/2001 | Cabrera et al. |
| 6,535,883 | B1 | 3/2003 | Lee |
| 6,883,136 | B1 | 4/2005 | Weinberg et al. |
| 7,249,140 | B1 | 7/2007 | Korenevsky et al. |

(Continued)

FOREIGN PATENT DOCUMENTS

| WO | 2005072047 A2 | 11/2005 |
| WO | 2013029817 A1 | 3/2013 |

OTHER PUBLICATIONS

Anonymous, "Method and System for Fixing Errors During Batch Updates in a Grid," IP.com, IPCOM000233758D, Dec. 19, 2013, 4 pages.

(Continued)

*Primary Examiner* — Evan Aspinwall
(74) *Attorney, Agent, or Firm* — Edward J. Wixted, III

(57) ABSTRACT

A method, computer program product, and computer system for identifying, by a computing device, a change to at least one record of a plurality of records in a multi-record update. At least one problem condition associated with the change to the at least one record is determined, wherein the at least one problem condition is determined via at least one problem definition object before the change is saved. The at least one problem condition is organized on a display. An action is executed on the at least one problem condition displayed.

20 Claims, 8 Drawing Sheets

(56) References Cited

U.S. PATENT DOCUMENTS

| | | |
|---|---|---|
| 7,409,398 B1 | 8/2008 | Flam et al. |
| 8,195,606 B2 | 6/2012 | Lu et al. |
| 8,789,013 B1 | 7/2014 | Lloyd |
| 9,910,883 B2 | 3/2018 | Barroso |
| 10,180,957 B2 | 1/2019 | Barroso |
| 10,204,134 B2 | 2/2019 | Barroso |
| 2001/0042119 A1 | 11/2001 | Urano et al. |
| 2002/0016717 A1 | 2/2002 | Ponzio |
| 2002/0083171 A1 | 6/2002 | Hoogenboom |
| 2003/0084074 A1 | 5/2003 | Balogh |
| 2004/0024740 A1 | 2/2004 | McGeorge |
| 2004/0024842 A1 | 2/2004 | Witt |
| 2004/0230580 A1 | 11/2004 | Li et al. |
| 2005/0021701 A1 | 1/2005 | Seki et al. |
| 2005/0033777 A1 | 2/2005 | Moraes |
| 2005/0262072 A1 | 11/2005 | Chen et al. |
| 2005/0273697 A1 | 12/2005 | Weinberg |
| 2006/0174054 A1 | 8/2006 | Matsuki |
| 2006/0179042 A1* | 8/2006 | Bram .................. G06F 16/2453 |
| 2006/0190487 A1 | 8/2006 | Hicks |
| 2007/0050174 A1 | 3/2007 | DeWitt, Jr. |
| 2007/0055671 A1 | 3/2007 | Bengel et al. |
| 2007/0150520 A1 | 6/2007 | Bennett et al. |
| 2007/0271510 A1* | 11/2007 | Grigoriu ............... G06F 40/232 715/257 |
| 2008/0016110 A1 | 1/2008 | Grossman et al. |
| 2008/0046484 A1 | 2/2008 | Ellis et al. |
| 2008/0062885 A1 | 3/2008 | Moon et al. |
| 2008/0065680 A1 | 3/2008 | Moon et al. |
| 2008/0201290 A1 | 8/2008 | Ponmudi |
| 2008/0263105 A1 | 10/2008 | Nakamura |
| 2009/0119302 A1 | 5/2009 | Palmer et al. |
| 2009/0172020 A1 | 7/2009 | Kernke et al. |
| 2009/0193420 A1 | 7/2009 | Ayars |
| 2009/0216809 A1 | 8/2009 | Horii et al. |
| 2009/0228435 A1 | 9/2009 | Dattathreya |
| 2009/0228531 A1 | 9/2009 | Baumann |
| 2010/0070536 A1 | 3/2010 | Merritt |
| 2011/0125827 A1 | 5/2011 | Ramanathan |
| 2011/0218983 A1 | 9/2011 | Chaney et al. |
| 2011/0320972 A1 | 12/2011 | Marum et al. |
| 2012/0072464 A1 | 3/2012 | Cohen |
| 2012/0185449 A1 | 7/2012 | Gould et al. |
| 2012/0203736 A1 | 8/2012 | Marum et al. |
| 2013/0024422 A1 | 1/2013 | Konagolli Suresh et al. |
| 2013/0103990 A1 | 4/2013 | Hopper |
| 2013/0198145 A1 | 8/2013 | Avery et al. |
| 2013/0311479 A1 | 11/2013 | Bhatt |
| 2015/0089345 A1 | 3/2015 | Marimuthu |
| 2015/0205850 A1 | 7/2015 | Lu |
| 2015/0286641 A1 | 10/2015 | Barroso |
| 2015/0286669 A1 | 10/2015 | Barroso |
| 2016/0048513 A1 | 2/2016 | Barroso |
| 2016/0048550 A1 | 2/2016 | Barroso |
| 2018/0081878 A1 | 3/2018 | Barroso |

OTHER PUBLICATIONS

Anonymous, "Simplified View to Increase Usability and Ease-Of-Use When Performing Multirecord Updates(s) on Complex Objects," IP.com, IPCOM000230848D, Sep. 15, 2013, 5 pages.

IBM, "List of IBM Patents or Patent Applications Treated as Related", Appendix P, 2 pages, dated Dec. 5, 2019.

* cited by examiner

FIG. 5

AUTOMATIC DETECTION OF PROBLEMS IN A LARGE-SCALE MULTI-RECORD UPDATE SYSTEM AND METHOD

BACKGROUND

Various kinds of data repositories may manage their content in multiple forms, such as records. A record may generally be described as, e.g., a collection of individual data fields, which may be of different types. For example, the records may represent bug reports and may include information about how to reproduce the bug, what version of the product in which the bug was found, how serious the bug is, etc. A record of this type may include fields that identify a feature or component that has the bug, a developer who may work on fixing the bug, what future release of the product may get the fix, etc.

Records may also have relationships to other records. For instance, records of one type could have relationships with other records of the same type. For example, a bug report may have a list of related bug reports. Relationships may also include records of different types. For example, a bug report may be planned to be fixed in a certain "iteration", where the iteration itself may be a type of record. In the example, custom workflows may be defined to match a customer's desired business practices. For instance, the system may require that a record have certain fields set before it may be saved or moved to a new state. The same changes may be made to more than one record, and with a large number of records being changed, there is an increased likelihood that something may go wrong that may then affect large numbers of records.

BRIEF SUMMARY OF DISCLOSURE

In one implementation, a method, performed by one or more computing devices, may include but is not limited to identifying, by a computing device, a change to at least one record of a plurality of records in a multi-record update. At least one problem condition associated with the change to the at least one record may be determined, wherein the at least one problem condition may be determined via at least one problem definition object before the change is saved. The at least one problem condition may be organized on a display. An action may be executed on the at least one problem condition displayed.

One or more of the following features may be included. Identifying the change to the at least one record may include monitoring changes in a directly selected record of the plurality of records. Identifying the change to the at least one record may include monitoring changes in a related record of the plurality of records that results from a changed workflow logic. The problem definition object may be customizable. The at least one problem condition may be organized on the display based upon, at least in part, at least one of the at least one record that is determined to have the at least one problem condition via the at least one problem definition object due to the change, the at least one problem condition object used to determine the at least one problem condition, and severity of the at least one problem condition. The action may include at least one of ignoring the at least one problem condition, cancelling the change to the at least one record, and correcting the change to the at least one record. The action may be executed on at least a portion of the at least one problem condition displayed.

In another implementation, a computing system includes a processor and a memory configured to perform operations that may include but are not limited to identifying a change to at least one record of a plurality of records in a multi-record update. At least one problem condition associated with the change to the at least one record may be determined, wherein the at least one problem condition may be determined via at least one problem definition object before the change is saved. The at least one problem condition may be organized on a display. An action may be executed on the at least one problem condition displayed.

One or more of the following features may be included. Identifying the change to the at least one record may include monitoring changes in a directly selected record of the plurality of records. Identifying the change to the at least one record may include monitoring changes in a related record of the plurality of records that results from a changed workflow logic. The problem definition object may be customizable. The at least one problem condition may be organized on the display based upon, at least in part, at least one of the at least one record that is determined to have the at least one problem condition via the at least one problem definition object due to the change, the at least one problem condition object used to determine the at least one problem condition, and severity of the at least one problem condition. The action may include at least one of ignoring the at least one problem condition, cancelling the change to the at least one record, and correcting the change to the at least one record. The action may be executed on at least a portion of the at least one problem condition displayed.

In another implementation, a computer program product resides on a computer readable storage medium that has a plurality of instructions stored on it. When executed by a processor, the instructions cause the processor to perform operations that may include but are not limited to identifying a change to at least one record of a plurality of records in a multi-record update. At least one problem condition associated with the change to the at least one record may be determined, wherein the at least one problem condition may be determined via at least one problem definition object before the change is saved. The at least one problem condition may be organized on a display. An action may be executed on the at least one problem condition displayed.

One or more of the following features may be included. Identifying the change to the at least one record may include monitoring changes in a directly selected record of the plurality of records. Identifying the change to the at least one record may include monitoring changes in a related record of the plurality of records that results from a changed workflow logic. The problem definition object may be customizable. The at least one problem condition may be organized on the display based upon, at least in part, at least one of the at least one record that is determined to have the at least one problem condition via the at least one problem definition object due to the change, the at least one problem condition object used to determine the at least one problem condition, and severity of the at least one problem condition. The action may include at least one of ignoring the at least one problem condition, cancelling the change to the at least one record, and correcting the change to the at least one record. The action may be executed on at least a portion of the at least one problem condition displayed.

The details of one or more implementations are set forth in the accompanying drawings and the description below. Other features and advantages will become apparent from the description, the drawings, and the claims.

BRIEF DESCRIPTION OF THE DRAWINGS

FIG. 5 is an illustrative diagrammatic view of a screen image displayed by the batch process of FIG. 1 according to one or more implementations of the present disclosure;

Like reference symbols in the various drawings indicate like elements.

DETAILED DESCRIPTION

Figure 1:
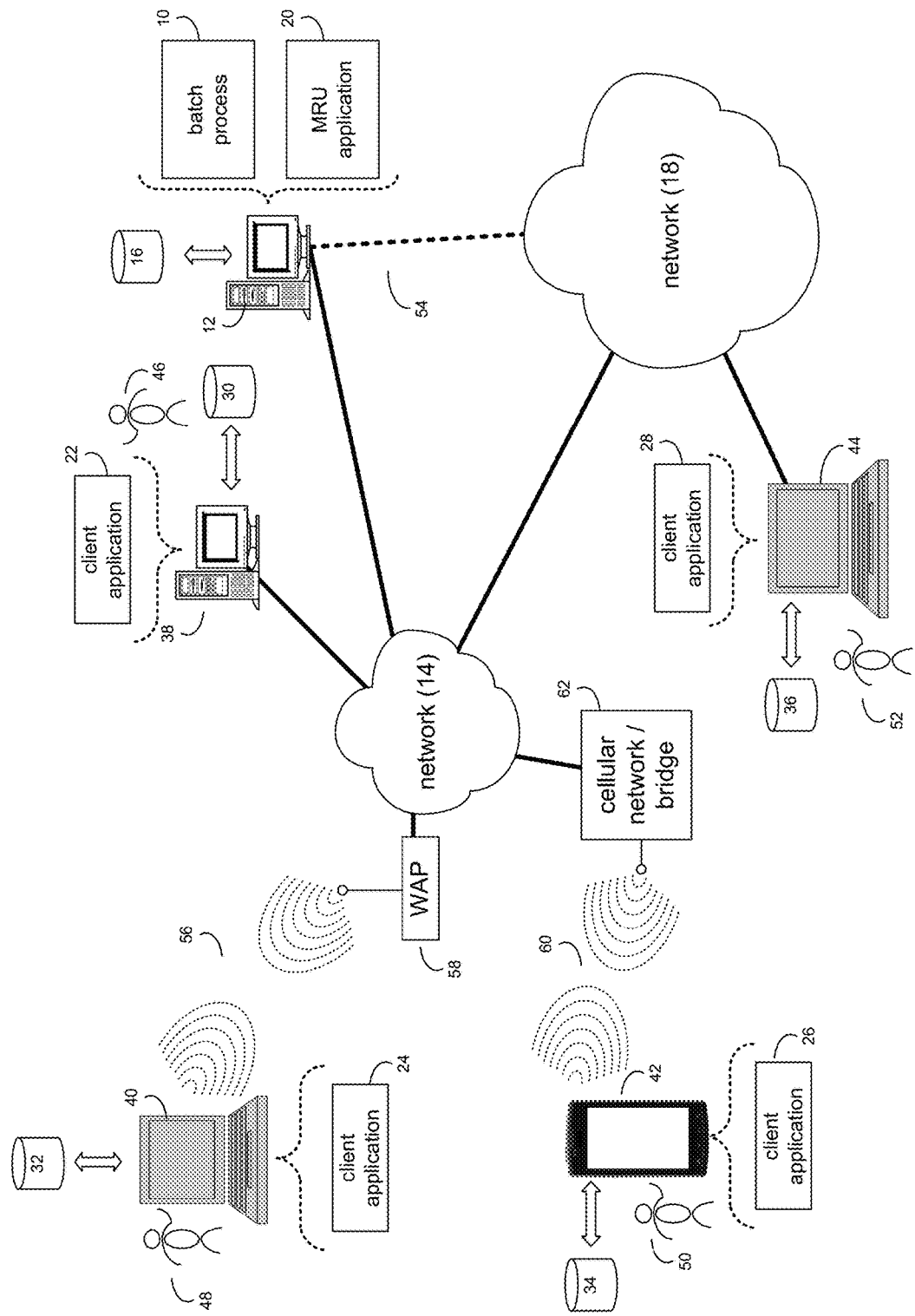
FIG. 1 is an illustrative diagrammatic view of a batch process coupled to a distributed computing network according to one or more implementations of the present disclosure.

System Overview:

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown batch process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, batch process 10 may identify, by a computing device, a change to at least one record of a plurality of records in a multi-record update. At least one problem condition associated with the change to the at least one record may be determined, wherein the at least one problem condition may be determined via at least one problem definition object before the change is saved. The at least one problem condition may be organized on a display. An action may be executed on the at least one problem condition displayed.

The instruction sets and subroutines of batch process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triplestore database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Batch process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a multi-record update (MRU) application (e.g., MRU 20), examples of which may include, but are not limited to, e.g., a batch editing application, a batch triage application, or other application that allows for batch editing and/or updating. Batch process 10 and/or MRU application 20 may be accessed via client applications 22, 24, 26, 28. Batch process 10 may be a stand alone application, or may be an applet/application/script/extension that may interact with and/or be executed within MRU application 20, a component of MRU application 20, and/or one or more of client applications 22, 24, 26, 28. MRU application 20 may be a stand alone application, or may be an applet/application/script/extension that may interact with and/or be executed within batch process 10, a component of batch process 10, and/or one or more of client applications 22, 24, 26, 28. One or more of client applications 22, 24, 26, 28 may be a stand alone application, or may be an applet/application/script/extension that may interact with and/or be executed within and/or be a component of batch process 10 and/or MRU application 20. Examples of client applications 22, 24, 26, 28 may include, but are not limited to, e.g., a batch editing application, a batch triage application, or other application that allows for batch editing and/or updating, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of batch process 10 (and vice versa). Accordingly, batch process 10 may be a purely server-side application, a purely client-side application, or a hybrid server-side/client-side application that is cooperatively executed by one or more of client applications 22, 24, 26, 28 and/or batch process 10.

One or more of client applications 22, 24, 26, 28 may be configured to effectuate some or all of the functionality of MRU application 20 (and vice versa). Accordingly, MRU application 20 may be a purely server-side application, a purely client-side application, or a hybrid server-side/client-side application that is cooperatively executed by one or more of client applications 22, 24, 26, 28 and/or MRU application 20. As one or more of client applications 22, 24, 26, 28, batch process 10, and MRU application 20, taken singly or in any combination, may effectuate some or all of the same functionality, any description of effectuating such functionality via one or more of client applications 22, 24, 26, 28, batch process 10, MRU application 20, or combination thereof, and any described interaction(s) between one or more of client applications 22, 24, 26, 28, batch process 10, MRU application 20, or combination thereof to effectuate such functionality, should be taken as an example only and not to limit the scope of the disclosure.

Users 46, 48, 50, 52 may access computer 12 and batch process 10 (e.g., using one or more of client electronic devices 38, 40, 42, 44) directly through network 14 or through secondary network 18. Further, computer 12 may be connected to network 14 through secondary network 18, as illustrated with phantom link line 54. Batch process 10 may include one or more user interfaces, such as browsers and textual or graphical user interfaces, through which users 46, 48, 50, 52 may access batch process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
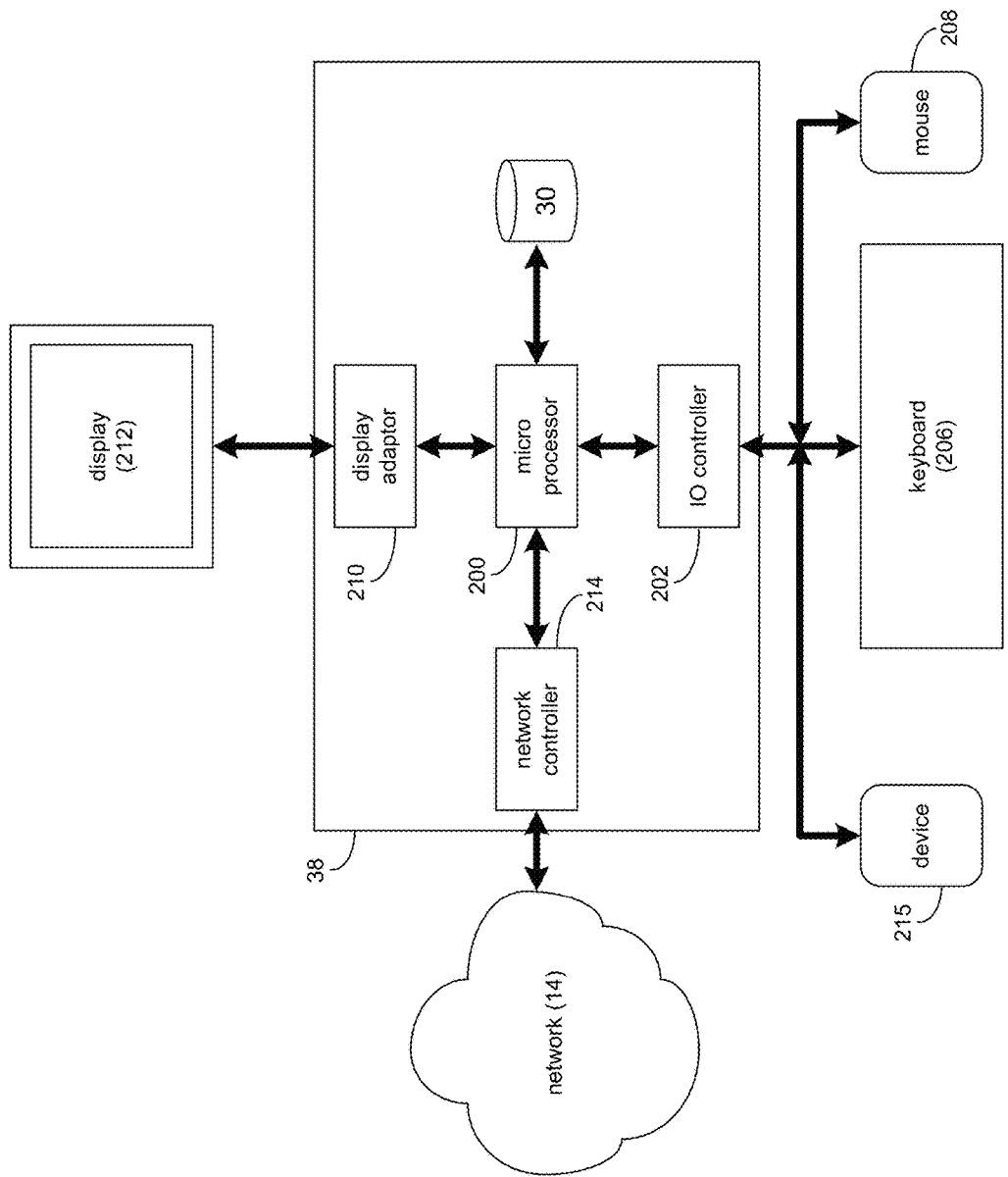
FIG. 2 is a diagrammatic view of a client electronic device of FIG. 1 according to one or more implementations of the present disclosure.
Figure 3:
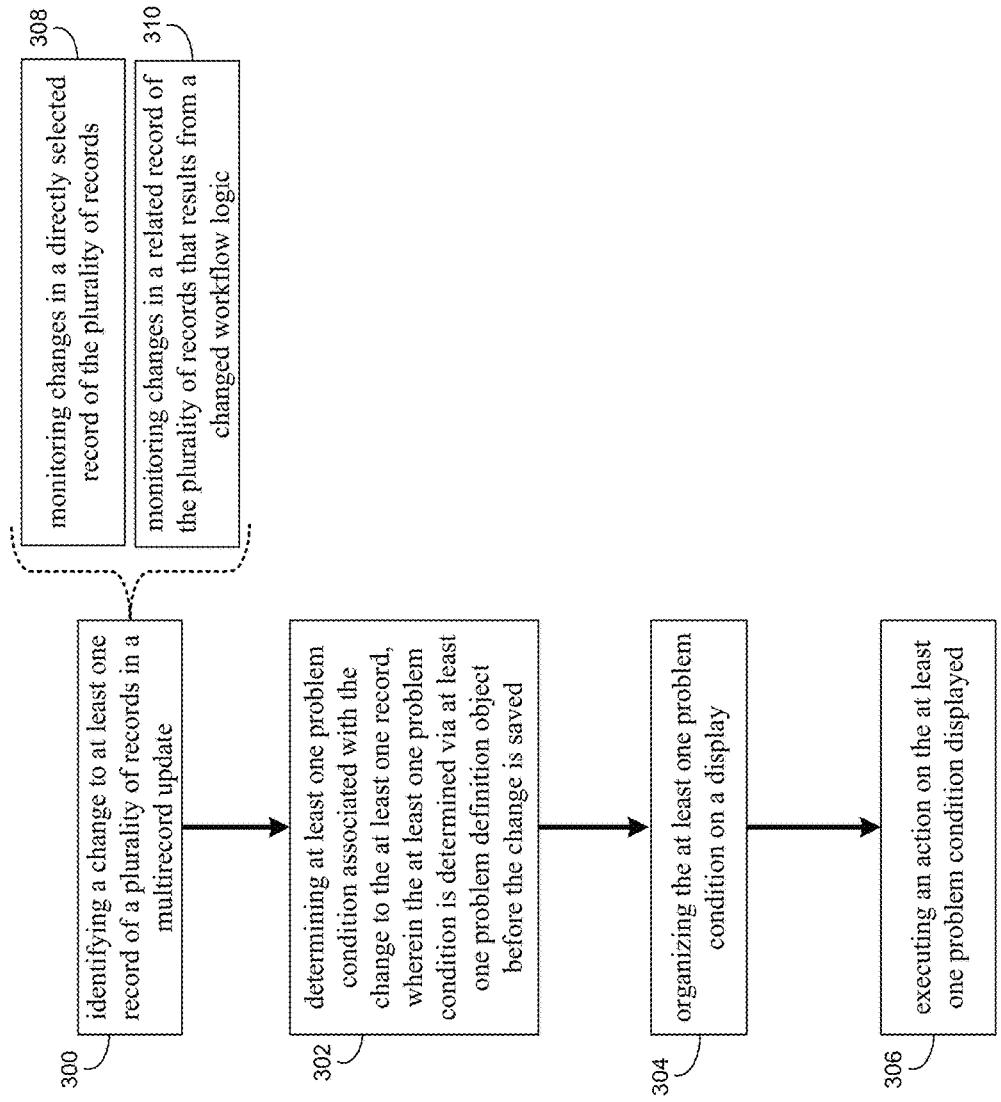
FIG. 3 is an illustrative flowchart of the batch process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, batch process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Various kinds of data repositories may manage their content in multiple forms, such as records. A record may generally be described as, e.g., a collection of individual data fields, which may be of different types. For example, the records may represent bug reports and may include information about how to reproduce the bug, what version of the product in which the bug was found, how serious the bug is, etc. A record of this type may include fields that identify a feature or component that has the bug, a developer who may work on fixing the bug, what future release of the product may get the fix, etc.

Records may also have relationships to other records. For instance, records of one type could have relationships with other records of the same type. For example, a bug report may have a list of related bug reports. Relationships may also include records of different types. For example, a bug report may be planned to be fixed in a certain "iteration", where the iteration itself may be a type of record. In the example, custom workflows may be defined to match a customer's desired business practices. For instance, the system may require that a record have certain fields set before it may be saved or moved to a new state.

The same changes may be made to more than one record. For example, the process of reviewing new bug report records and assigning them to a developer or future release may be described broadly as "triage". During a triage session, more than one bug report record may have the same disposition, particularly for the future release where it may be fixed. As an example to make the change to those bug reports, the developer performing the triage may like to set the future release in one record and have that same change be made to some number of other records. Such a change may be described broadly as batch editing or a multi-record update (MRU).

Some example techniques may be used for performing multi-record updates. For example, some techniques may make changes to many records based on a recording of changes made directly on a single record (e.g., a template record). However, it may be necessary sometimes to record changes on related records and play those back as well. For example, consider a defect tracking system with a variety of related record types. An example MRU application 20 that may implement a defect tracking system is IBM Rational ClearQuest, a flexible change tracking tool that may be configured to function as a defect tracking system for software development. MRU application 20 may define different record types, assign relationships and state models to customize the workflow. The example defect tracking system of MRU application 20 may define user interfaces (e.g., forms) for submitting and modifying defect records. The example defect records may have fields like, e.g., (1) headline—a short one-line description of the defect, (2) description—a longer description of the defect including steps on how to reproduce it (3) severity—how bad the defect is, (4) priority—how important it is to fix it, (5) owner—the developer who will work on it.

Consider an example defect tracking system associated with MRU application 20, where a defect record may have one or more records that track actual work done to resolve the defect. These record types are generally called an Activity. The Activity record may have a data field called "ScheduledFor" that may represent when in the schedule it should be performed, e.g., "Iteration 15". A defect may have more than one Activity if, e.g., more than one developer was working on it, or if they had to rework the original solution to the problem. Thus, if a developer wanted to work on a defect in a certain iteration, they may use a user interface associated with MRU application 20 to enter an input (e.g., click a "StartWork" button on the defect form). This "StartWork" button may enable a pop up window form that may enable the user to create a new Activity record. The form may have some values already populated in it to make it easier for the user. For example, if the Defect was assigned to Bob the Engineer, then the Activity may, by default, be assigned to Bob as well. Bob may still have to decide which iteration to schedule it for, so Bob may select "Iteration 15" from the Activity form and click "Save". The new Activity may be created, scheduled for "Iteration 15", and may be linked to the defect record for which the work may be done. Thus, when viewing the defect, the user may see that it has a list of Activity records indicating work that was actually done to resolve the defect.

A common task for software teams may be triage or activity planning. The teams may meet to decide which defect records to work on for a given iteration. In the example given above, the teams may decide which defect records they want to work on in "Iteration 15", set them to "High" priority, and then create an Activity record associated with each defect record and set the ScheduledFor value on the Activity records to "Iteration 15". MRU application 20 may capture changes made in one form and play those back on additional records in the selection. However, other examples of MRU applications may only allow the user to capture changes on one record, and play those back against one record at a time, and not allow the user to capture changes across related records. For example, if the user wanted to capture the above-noted operation, the user may need to capture both the changes to the defect (e.g., setting priority to "high") and any field values set in the Activity you create (such as "ScheduledFor").

When performing an MRU on systems where there may be significant customized workflow (e.g., business logic), users may be more interested in performing utility actions on records rather than just making changes to data fields. For example, a utility action may be a customized business function (e.g., written by the owner/administrator of the MRU application) that is executed on the record. They may be defined as scripts by the customer and run when the user edits the record and clicks on a "Run" button of an associated user interface. While recording changes on records and related records, the teams may want to record any utility actions run as those "Run" buttons are clicked (or otherwise selected). Due to their scripted nature, they may have a different affect on each record on which it runs, as the actual changes may depend on the record's current state and field values, or it may depend on some external conditions. For example, a utility action may be defined to find the developer with the lowest workload and assign the Activity to that person. Often, these utility actions may be combined with other field changes on the record. For example, during a defect triage process, a team member may 1. assign a defect to be fixed in the next version of the product, 2. create an Activity on the defect and assign it to the current iteration, and 3. run a utility action on the Activity, which may find the developer with the lowest workload.

For change management systems (e.g., MRU application 20) with a customized workflow, it may be (in some implementations) necessary to make changes in a particular order. For example, setting a 'project' field in a defect may allow certain developers to be set as 'owner'. When playing back the changes, MRU application 20 may set the 'project' field first before setting the 'owner' field. Even if MRU application 20 possessed a utility action that will set several required fields automatically, the user may still be required to set the 'iteration' first. During play back, MRU application 20 may set the 'iteration' first then perform the action. The order in which the user performs the actions on the template record will also be the order in which the changes and actions are played back. This additional data about the order of changes and actions may be preserved and used during play back. That is, it may not be enough to just record an unordered set of changes and buttons.

The method used to edit, e.g., the first record, may vary, such as having a list of fields in tabular form that may be changed, or in a form using the same method as is used to edit a single record. Outside of a multi-record update, the record may be presented via a GUI (as discussed below) that may show the individual data fields and may allow the user to enter new data or modify the existing data. Once all the desired changes have been made, the record may be saved. This same form may be used to record the changes to be applied to other records.

In other example scenarios, the records may be presented in, e.g., grid or table format, where each row of the grid may represent one record and each column may represent one field. This grid may include only some of the fields of the record. The user may be allowed to edit the data in the grid on each row individually, and then save the changes, either on a per row basis or by saving all the changed rows at once.

Some techniques may be used for performing MRU operations on records. For example, a user interface may present a view that enables a user to see all the changes made to the template record before applying them to the rest of the batch records. This may help the user to spot certain problems. Sometimes, however, the user may not know what changes will occur on the records until after the user has applied all the field changes and actions. For systems with complex workflows, where setting one field value may trigger other actions, the user may have to set all the field values and perform any necessary actions before being able to see what the result will be. In that example case, the user may not get any indication of what the results may be before they are applied. The user may thus have to wait until the MRU tries to apply those changes to each record in order to know whether or not they were successfully applied.

Changes may also be previewed in a grid where the user may see all the relevant data and decide whether to proceed or cancel the MRU. The user may be able to spot errors in the grid visually if the data being displayed is not too large. This technique, however, may be less useful and usable if there is hundreds, or thousands of records to change. That is, it may be too difficult and time-consuming to look at all the changes and be sure that everything is okay. Moreover, if there are many field changes per record, it may be difficult to accurately check the result.

Some record systems may have defined workflows that may cause changes in other parts of the record as they are changed. For instance, a record system may bring fields into the grid that are not already shown but are now invalid due to the changes made. This may be a reasonable technique if the number of records and fields being modified is not too large, but it may be difficult to use for large sets of records.

To keep things simple and usable, the system may not bring fields into the grid that have changed but are still valid. However, these are changes the user may want to look at when looking for potential errors. Even though the workflow considers it to be valid, it may be not be what the user intended. It may also be that more fields are being changed than are visible on the grid.

Some record systems may have defined workflows that may cause changes in other parts of the record as the user makes changes. These fields that have been changed indirectly may not be visible on the grid. It may also be that the changes span different types of records. For examples, suppose the user made changes to a defect and its associated activity. These kinds of changes may be difficult to verify in a tree or grid form.

Figure 4:
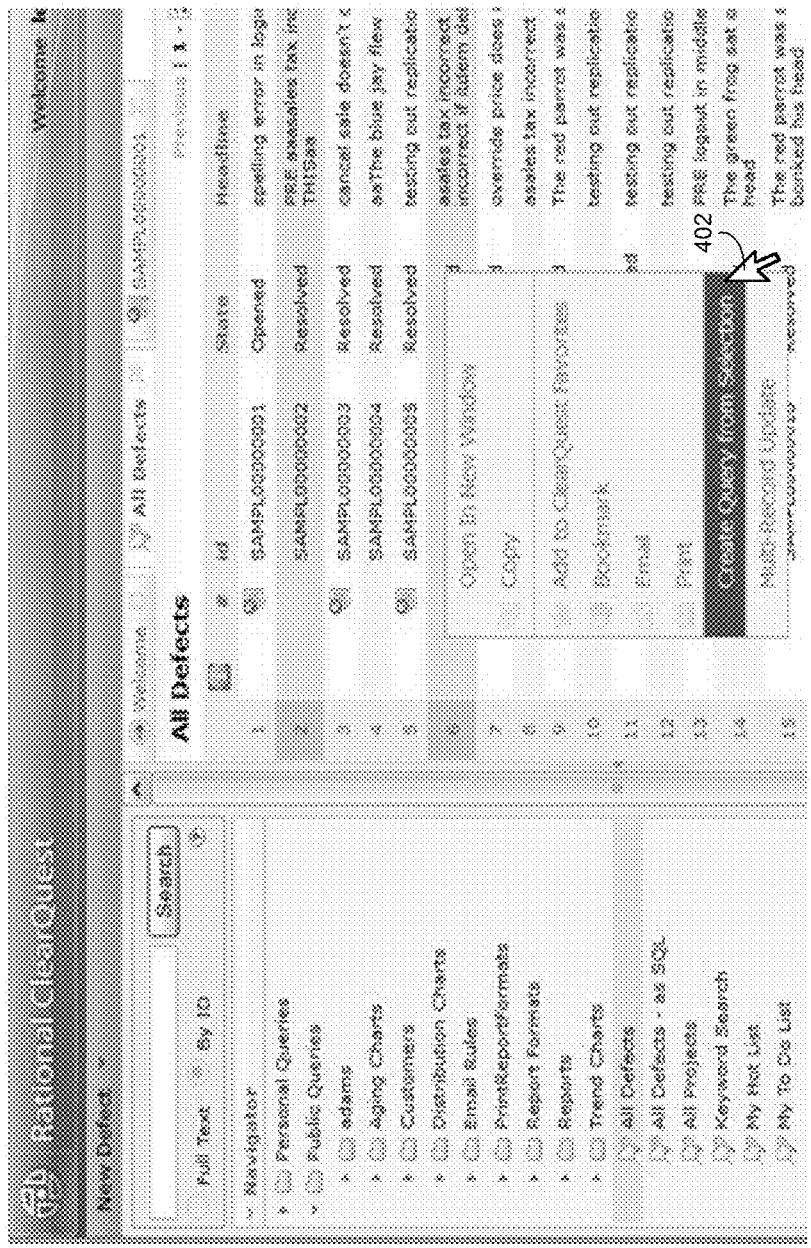
FIG. 4 is an illustrative diagrammatic view of a screen image displayed by the batch process of FIG. 1 according to one or more implementations of the present disclosure.

As noted above, in some implementations, batch process 10 may receive, by a computing device (e.g., client electronic device 38), a selection of a set of records to edit in a multi-record update operation. For instance, assume for example purposes only that a user (e.g., user 46) is utilizing a user interface (e.g., user interface 400) associated with batch process 10, MRU application 20, client application 22, or combination thereof. In the example, batch process 10 may operate on some or all records on a display page of a result set (shown in FIG. 4). Further in the example, user 46 may (e.g., via batch process 10) create a query that selects just the records desired for MRU application 20 (e.g., using tags, keywords, normal query filters to select desired records, etc.), and/or use a pointing device (e.g., cursor 402) to select a subset of records from an existing query, and create a query from the selection to obtain a new result set with the above-noted received selections.

Figure 5:
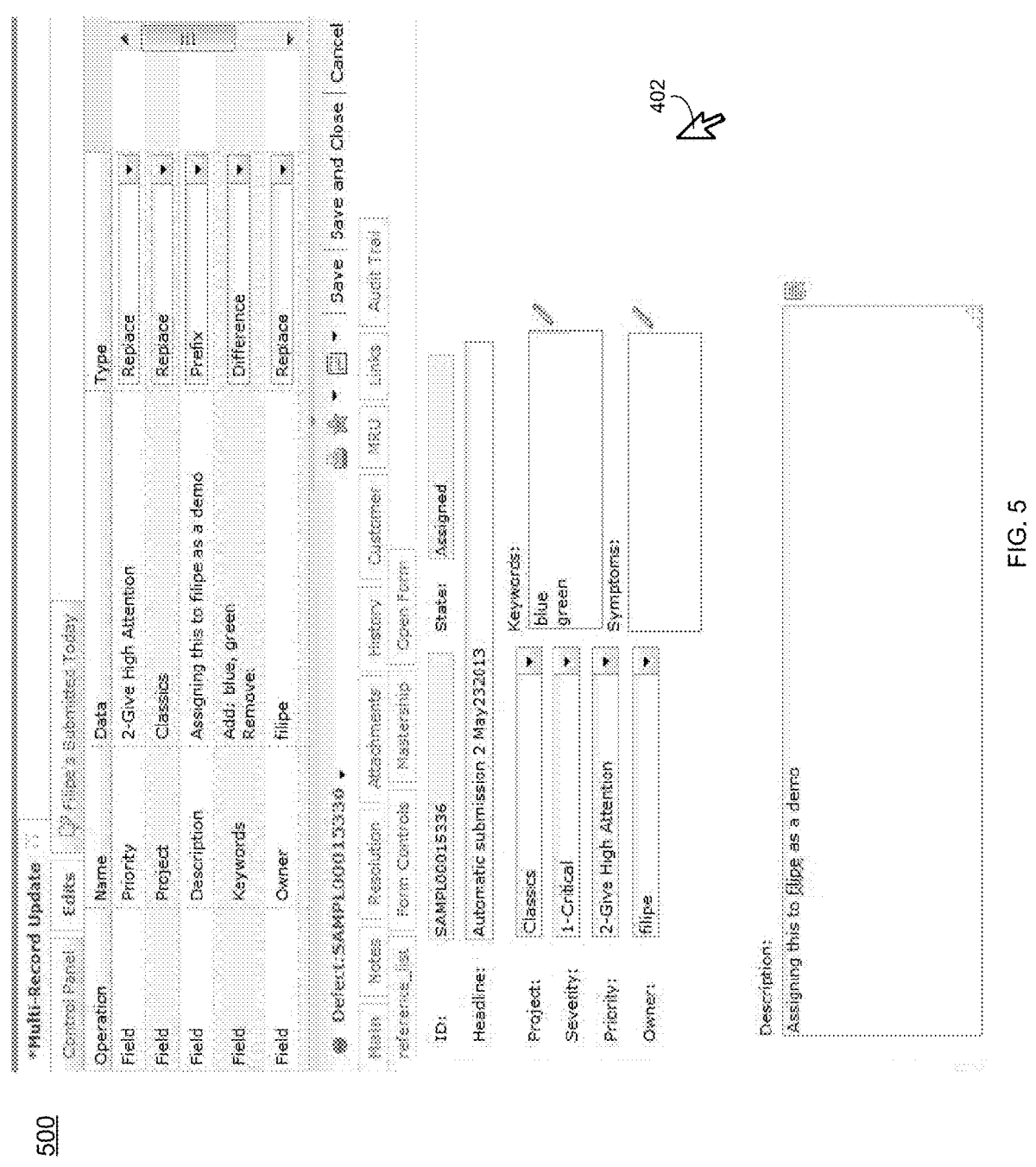

In some implementations, batch process 10 may receive a selection of at least one record of the set of records on which to capture one or more changes. For example, the at least one record of the set of records may include a template record. For example, in some implementations, as will be discussed in greater detail below, a change made to many records by batch process 10 may be based on a recording of one or more changes made directly on a single record (e.g., a template record). The recording of the one or more changes may include an indication of the one or more changes that are made on the single record, and may include an indication of a sequence, order, or timing (e.g., either relative or absolute) in which the changes are made. An example template record 500 from user interface 400 is shown in example FIG. 5.

In some implementations, at least one aspect of the at least one record of the set of records may be captured by batch process 10. For example, as will be discussed below, in some implementations, the at least one aspect may include a change to template record 500, and the at least one aspect may include an action performed on template record 500. An action (e.g., a utility action) may include a customized business function (e.g., written by the owner/administrator of MRU application 20) that may be executed on the record. They may be defined as scripts by the customer and run when the user edits the record and uses, e.g., a mouse 208 (or other pointing device) cursor 402 to click on a "Run" button. For instance, any aspects (e.g., change and/or action) performed on the above-noted user-interface 400 to edit template record 500 may be captured or recorded by batch process 10. This may include changes to, e.g., field values, and any actions that may be performed as a result of received user-inputs (e.g., mouse button clicks). In some implementations, if a field is changed multiple times, each edit may be recorded separately. For example, if user 46 types in a keyword, then uses a mouse to click "add", then types in a new keyword and clicks "add" again, then batch process 10 may capture or record "keyword edit, add, keyword edit, add." These changes and actions may be captured in a single object of data containing information about the change or action and the order of these changes. The captured aspects may be stored in, e.g., an array, which may look like the below example:

```
CapturedChanges = [
    {begin_action},
    {operation 1},
    {operation 2},
    {operation 3},
    ....
    {operation n}
]
```

The nodes in CapturedChanges are described below:

begin_action—The begin_action node may describe any "important" information that may be necessary for batch process 10 to start editing the record(s). In some implementations, batch process 10 may define certain actions user 46 may take to begin editing a record. For example, batch process 10, which may support records that have state-models, may enable user 46 to define a modify action type and state-transition action types. In some implementations, until any of these actions are run, the records may not be editable. The modify action types may make the record editable. The state-transition action types may change the record's state and then may make the records editable. The begin_action node may would have this example data:

```
operation = [
    type: begin_action,
    action_id
]
``` operation: field—The "operation" entries may define either a field change or other action taken in the record's form. For example a field change on template record 500 may have this example data:

```
operation = [
    type: field_edit,
    field_id, /* e.g. "headline" */
    old_value, /* e.g. "The user cannot modify the record" */
    new_value, /* e.g. "[STOPSHIP] The user cannot modify the record" */
    change_datum, /* e.g. "[STOPSHIP] " */
    change_type /* e.g. "append".... could also be replace, prefix, etc*/
]
```

Batch process 10 may define many change types that may be available in a field.

operation: utility action—An "operation" entry may also be a utility action (e.g., button click) on template record 500 and may have the following example data:

```
operation = [
    type: utility_action,
    utility_action_id /* identifier for the utility action to run on the
        record */
]
```

In some implementations, capturing the at least one aspect of the at least one record of the set of records may include batch process 10 capturing at least one aspect of at least one related record that is related to the at least one record of the set of records. For example:

operation: new related record—This "operation" may specify creation of a new related record. For instance, batch process 10 may enable records to have links to other related records. For example, a "Defect record" may have one or more "Activity records". A record may be linked by batch process 10 to other records using, e.g., a special field that may contain one or more references to other records. For example, the filed may have a single-reference field that may link to only one record, or the field may have a reference list field that may link to one or more records. In some implementations, batch process 10 may enable user 46 to create a new related record by, e.g., clicking on a user interface button on a form that creates the new record. For example, there may be a user interface button, "Create Activity", which may create a new Activity record.

If user 46 chooses to create a new related record, then a new form may be rendered (e.g., via a pops up window) and display a form user 46 may typically see when creating that record. User 46 may make changes and perform actions on this form just as was done on template record 500 form. In some implementations, the pop-up window may be modal (i.e., will not allow editing to template record 500 until saving the new record). The changes and actions captured to the fields of this new record may be recorded just like they are for template record 500, except these changes may be captured inside a single operation block in an embedded CapturedChanges, e.g.:

```
operation = [
    type: new_related_record,
    new_record_action_id, /* identifier for the action to create the
        related record
    */
    pause_after_create,
    CapturedChanges for new record
]
```

In the example, the new_record_action_id attribute may specify an action that batch process 10 may run/execute when creating the new record. This may be a customized utility action that may be done to prepare the record before its related record may be created. Note CapturedChanges may also have a begin_action for the new record, and this may be different from the new_record_action_id. This may be the action that begins the creation of the record. Batch process 10, for example, may enable user 46 to define multiple submit actions for a given record. The submit action used to create the record may be captured to ensure proper play back (discussed in greater detail below).

The pause_after_create attribute may be a boolean type field that may specify whether the play back should pause after the record is created but before it is saved. In some implementations, if it is set to pause on create, batch process 10 may present the record form with the new record in it, allowing user 46 to check that it is correct and/or make additional changes to the record before it is saved by batch process 10. In the example, if this is false, then there may be no pause and the records may be created and saved without user interaction.

In some implementations, playing back the at least one aspect on one or more remaining records of the set of records may include batch process 10 playing back the at least one aspect of the at least one related record. In an embodiment, playing back the at least one aspect on the one or more remaining records may generally include implementing the one or more recorded changes on the one or more remaining records. In some embodiments, playing back the at least one aspect may include implementing the one or more recorded changes in the order or sequence in which the changes were made. For example:

operation: modify related record—To edit a related record, user 46 may (via batch process 10) right-click on a reference field value in template record 500 form and choose "Edit" from the menu. The menu may be configured by batch process 10 to have multiple items to specify different edit actions (e.g., allowing user 46 to choose one of many different actions to start editing). For example, the actions may include "Modify", "Assign", "Postpone", etc. When user 46 chooses the action, a record form may pop up (e.g., via a pop up window) for that related action and allow user 46 (via batch process 10) to edit the record. In the example, similarly as noted above, the form may be modal, thus preventing edits on template record 500 until the related record is saved. In the example, the changes and actions to the related record may be captured in a similar manner as noted above, including the begin_action used to start the edit. In some implementations, there may be two additional pieces of information to capture, and that may include, e.g., which field the referenced record is linked to, and which reference to play the changes back on.

```
operation = [
    type: modify_related_record,
    field_id, /* field which holds the reference to the related record being
        edited */
    which_reference, /* which reference to modify */
    pause_on_modify, /* whether to pause after each modify */
    CapturedChanges for new record
]
```

The which_reference attribute may be used to tell batch process 10 which reference in the field to operate on. For fields that only allow one reference, the value may be ignored. For fields that may have multiple references, such as reference list type fields, then this value may have one of the following example values:

first_reference—The first reference in the list may be modified last_reference—The last reference in the list may be modified all_references—All references in the list may be modified manually_choose—During play back, the user may be given a choice on which reference or references to have batch process 10 play the changes back on.

Batch process 10 may try to automatically detect what user 46 wants, but may allow the user to change this before the play back begins. If the related record edited in the field is the first reference, then first_reference may be chosen. If it is the last reference, then last_reference may be chosen. If it is in the middle, then which_reference may be set to manually_choose. These defaults may make batch process 10 more usable, as it may interpret what user 46 may want, so that user 46 need not have to re-configure play back.

In some implementations, the CapturedChanges in the above-noted defined operations may themselves have subsequent 'new' or 'modify related record' nodes, and thus, there may be unlimited nested operations on related records.

In some implementations, batch process 10 may play back the at least one aspect on one or more remaining records of the set of records. In some implementations, before play back, batch process 10 may enable user 46 with the ability to adjust how play back occurs. For example, user 46 may specify whether to pause_on_create for "new_related_record" or pause_on_modify for "modify_related_record" type operations. User 46 may change how field operations are performed by batch process 10. For example, user 46 (via batch process 10) may change the performance from "replace" to "append", and may change the value on the modify_related_records operations.

In some implementations, the at least one aspect on the one or more remaining records of the set of records may be played back in a same order in which each aspect is captured. For instance, assume user 46 is satisfied with the captured changes and how they may be played back, and thus selects to have batch process 10 begin the play back. In some implementations, when play back occurs, all the operations recorded in the top level CapturedChanges may be played back in the exact same order on every record. This may ensure that changes and actions are played back in the correct order for the custom workflow of batch process 10. The begin_action operation may start the edit process on the record. Then, each operation node may be executed on the record. In the example, if it is a field operation, then the value of the field may be altered accordingly by batch process 10. For example, if it is an APPEND operation, the change_datum text may be appended to the field's current value. If the operation is a utility action, then the action may be executed on the record.

In the example, if the operation node is for creating a new related record, then the utility action specified by new_record_action_id may be executed first. Then, the embedded CapturedChanges in this node may be used to create the new record (including the begin_action which may be a submit action) and they may be played back against this new record. In the example, if the pause_after_create is set to true, then before this new record is saved, a new form may be displayed to user 46 with the new record data in it. User 46 may then have a chance (via batch process 10) to check the record for any errors, or to make further changes on the record. When batch process 10 receives an input from user 46 (e.g., clicking "Save" on the form), batch process 10 may save the record and continue with the play back.

In the example, if the operation node is for modifying an existing record, then the record to be modified by batch process 10 may be determined using, e.g., the field_id and the above-noted values on the operation node. If first_reference or last_reference is specified, then the first or last reference in the field list may be used by batch process 10, respectively. If all_references is specified, then all references in the field may be used by batch process 10. If manually_choose is specified, then play back may be paused and a list of references in the field may be presented to user 46, where user 46 (via batch process 10) may be asked to choose which references to modify in the operation. Once user 46 chooses which references to act on, the play back may continue.

Once the selection of the record (or list of records) is chosen and received by batch process 10, then batch process 10 may perform the actions on the record in the embedded CapturedChanges. In some implementations, batch process 10 may start by running the begin_action and may then follow by running all the operations. In the example, if pause_on_modify is set, then the play back may be paused after all the actions and changes in the embedded CapturedChanges are played back, but before it is saved. A form may pop up (e.g., a pop up window via the above-noted user interface 400) showing the modified record and may allow user 46 to check the values and perform additional modifications. When batch process 10 receives an input by user 46 (e.g., clicking "Save" on the modified related record form), then play back may continue.

In the example, if the field_id corresponds to a reference list field and the which_reference attribute is set to all_references or manually_choose (e.g., with multiple references chosen by user 46), then the embedded CapturedChanges may be played back against each of those referenced records. If pause_on_modify is chosen, batch process 10 may pause on each related record modified in this operation.

The Batch Process:

As discussed above and referring also at least to FIGS. 3-8, batch process 10 may identify 300, by a computing device, a change to at least one record of a plurality of records in a multi-record update. At least one problem condition associated with the change to the at least one record may be determined 302 by batch process 10, wherein the at least one problem condition may be determined 302 via at least one problem definition object before the change is saved. The at least one problem condition may be organized 304 on a display by batch process 10. Batch process 10 may execute 306 an action on the at least one problem condition displayed.

Batch process 10 may allow the user to perform multi-record updates on large sets of records with more confidence that the user will not catastrophically damage the managed data. Batch process 10 may include an automatic and customizable problem detection ability and may allow the user to take corrective actions based on the detected problems. For example, as will be described in greater detail, batch process 10 may capture the changes made during playback, analyze the changes to look for potential issues, show these potential issues to the user in an easily consumable way, and allow the user to confirm, ignore, or cancel these changes efficiently prior to saving (e.g., committing) the changes.

For example, as noted above, in some implementations, batch process 10 may identify 300, by a computing device, a change to at least one record of a plurality of records in a multi-record update. A multi-record update may be generally described as when a set of changes or actions may be applied in a prescribed order to a user-specified set of records. In some implementations, when a multi-record update is in progress, batch process 10 may monitor the update and keep track of some or all changes that are made, not only in the directly selected records in the multi-record update, but also in other records that are changed as a result of the customized workflow.

In some implementations, batch process 10 may enable user 46 to choose a set of records to modify using the above-noted user interface. For example, records may be selected from a table of records (e.g., possibly from a database query result set). Batch process 10 may enable user 46 to specify which changes are to be made to the records. For instance, this may be done using, e.g., a grid-based editing or form-based approach where user 46 may edit a form displaying a template record's data. This may be controlled via batch process 10 by a user preference. In the example, as changes are made in the grid or the form, the changes may be identified 300 (e.g., captured).

In some implementations, once user 46 is done making changes via the above-noted user interface, user 46 may instruct batch process 10 to the apply changes to the rest of the records in the multi-record update. In some implementations, identifying 300 the change to the at least one record may include batch process 10 monitoring 308 changes in a directly selected record of the plurality of records. For instance, as noted above, each selected record played back by batch process 10, the identified 300 change(s) that is monitored 308 and captured may be applied directly to the selected record(s).

In some implementations, identifying 300 the change to the at least one record may include batch process 10 monitoring 310 changes in a related record of the plurality of records that results from a changed workflow logic. For instance, as noted above, for each selected record played back, batch process 10 may monitor 310 and capture the identified 300 change(s) that occur as a result of the customized workflow logic. For example, if a change to a product causes the owner to change, then both changes may be captured. Batch process 10 may also capture workflow-related changes made on the related records.

At least one problem condition associated with the change to the at least one record may be determined 302 by batch process 10, wherein the at least one problem condition may be determined 302 via at least one problem definition object before the change is saved. For example, batch process 10 may use an object (e.g., a Problem Definition object or "ProblemDefinition") to define and rank a problem condition (e.g., a problem) that may be encountered, e.g., during execution. In some implementations, batch process 10 may have access to problem definitions that find common problems, but user 46 (e.g., as a system administrator or otherwise) may extend this to include their own problem definitions, which may allow user 46 to tailor batch process 10 to their customized workflow.

Continuing with the above example, the above-noted changes may be passed to, e.g., (MRU application 20) to be analyzed heuristically for potential issues. The analysis may be based on a set of predefined and custom rules and heuristics, which may be defined in the above-noted Problem Definition object. For example, as noted above, batch process 10 may have access to predefined rules for determining 302 (e.g., detecting) common problems, but may also allow the user (via a user interface) to define their own rules (and fine-tune existing problem definitions) to detect problems.

In some implementations, as changes are made on the play back records, but before the changes are saved, batch process 10 may analyze the identified changes and (e.g., automatically) determine 302 potential problems as described in the Problem Definition object. As the problem detection may be automatic, it may reduce or eliminate the human error component of scanning a large grid or set of records while looking for potential problems.

For example, batch process 10 may check for problems, e.g., once per field change or once per record. In some implementations, as will be explained more below, how this is invoked may depend on, e.g., how the ProblemDefinition is defined. In some implementations, batch process 10 may start with a bootstrap set of common problem definitions, which may be expanded by user 46 as user 46 becomes more familiar with their particular system. An example of a common problem may be that more fields changed during playback than those that were changed on the template record. Additional examples of common problems that may be part of the bootstrap may include, e.g., an error in the workflow (e.g., the record is not in the right state to accept the change) that occurred during playback that did not occur on the template record; a large amount of text is replaced with a small amount of text; a large list of items is replaced by a small list of items, etc.

In some implementations, batch process 10 may use the problem definitions to determine 302 problems by, e.g., comparing initial conditions of the record with conditions after an update and before the update is saved. In some implementations, the comparison may be expressed using comparison operators. In some implementations, the comparison may be expressed using computer code (e.g., one of the above-noted scripting languages). Problem definitions may be parameterized, allowing configuration and tuning using a user interface. For example, the problem definition may be written in computer code by using a parameter to control the logic of the script. This may be set by user 46 and the problem definition code may use it as noted above.

As noted above, the problem definition object may be customizable. For example, the ProblemDefinition object may be created and configured by user 46 and/or user 46 may enable batch process 10 to delegate permission for other users to create or modify their own ProblemDefinitions or tune administrator-defined ProblemDefinitions. A ProblemDefinition may include the following and non-limiting example attributes:

```
ProblemDefinition = [
    # It is either a field-based problem definition
    FieldIsProblem: <simple comparison operation or a block of
    computer code>
    FieldType: <type of field to check, could be 'any'>
    EachFieldChange: <boolean to check for problem on each field
    change>
    # or a record-based problem definition
    RecordIsProblem: <simple comparison operation or a block of
computer code>
    RecordType: <type of record to check, could be 'any'>
    #
    Severity: <simple numeric operation or a block of computer code>
    TunableParameters: [
        parametername: [
            type,
            default,
            constraints
        ],
        [e.g.]
        parameter1: [
            type: integer,
            value 100,
            default: 100,
            max: 200,
            min: 0
        ],
        parameter2: [
            type: boolean,
            value: true,
            default: true
        ],
        parameter3: [
            type: string,
            value: "",
            default: ""
        ]
    ]
]
```

The example FieldIsProblem and RecordIsProblem attributes may define whether a change may be a problem. A problem definition may have one or the other defined. If the FieldIsProblem attribute is defined, then batch process 10 may check every change for any field that matches Field-Type. The kinds of field types available may depend on the actual record system used. Some example common types may include short text, long text, integer, list, reference, etc. In the example, if the example EachFieldChange is true, then batch process 10 may check each time a field is changed. For example, if a field is changed two times, batch process 10 may check for problems each time. In the example, if EachFieldChange is false, batch process 10 may only check once all the changes have been applied to the record, but before the changes have been saved. Thus, in the example, even if the field was changed two times, batch process 10 may not check for problems until after the second change is applied.

Further in the example, if RecordIsProblem is defined, then the problem definition may be checked by batch process 10 only once for each record that is of the type that matches RecordType. The record may be checked once all the other changes are made on the record. The FieldIsProblem attribute may be used by batch process 10 for when a field-type problem may be determined 302 and the problem may be found more than once on a record. A RecordIsProblem may be used when the problem is triggered by the record as a whole. It will be appreciated that in some implementations, a ProblemDefinition may run once for the entire batch update (MRU) instead of once per field change or once per record being changed. It may be a separate field in the ProblemDefinition "batchUpdateIsProblem" and may be mutually exclusive with FieldIsProblem and RecordIsProblem. As will be appreciated by those skilled in the art, this may require making appropriate changes to the pseudocode portions containing, e.g., RecordIsProblem/FieldIsProblem.

For FieldIsProblem, batch process 10 may use oldvalue and newvalues as the old and new values of the field change being identified 300 and checked. As noted above, batch process 10 may utilize the problem definition via example comparison operators, e.g.: Problem(fieldname, oldvalue, newvalue)=length(oldvalue)>=(length(newvalue)+% max_allowed_change %), where max_allowed_change may be a tunable parameter and may equal 100. Batch process 10 may determine that a potential problem exists if the new value is at least 100 characters less than the old value (e.g., the new value is being made much smaller). In some implementations, "max_allowed_change" may be a parameter defined in the TunableParameters section, e.g.:

```
max_allowed_change: [
    type: integer,
    value: 100,
    default: 100,
    max: 200,
    min: 0
]
```

The severity of the issue may be defined as, e.g.: Severity (oldvalue, newvalue)=% severity_weight %*abs(length (oldvalue)−length(newvalue)), where severity_weight may be a tunable parameter and may allow user 46 to modify (e.g., increase or decrease) the severity of, e.g., losing text (or other problem condition).

As noted above, some rules may be defined using computer code. User 46 may write a subroutine in the scripting language for either FieldIsProblem, RecordIsProblem or Severity. For example, in using Perl as the scripting language, the example script may include, e.g.:

```
sub Problem( )
{
    my ($fieldname, $oldvalues, $newvalues, $tunable_parameters) = @_;
    # $fieldname - field name - empty if RecordIsProblem being used.
    # $oldvalues - record's old values and any related changing record values
    # $newvalues - record's new values (only changed values appear here)
    # $tunable_parameters - a hash reference of tunable parameters.
    #      These values may be set by a user configuration UI and may be used
    #      to adjust the problem definition.
    my $isProblem = 0;
    #.....look for a problem based on old and new values......
    return $isProblem;
}
```

In some implementations, the script may have access to all the old and new values in the record that have been changed in the multi-record update, including values of related records that are part of the change. The script may have the current record's old values and any related record field values that are changing. The newvalues parameter may have only the new values of the record and its related records. The tunable_parameters may have the user configured values that the problem definition defines in TunableParameters. In using Perl as the scripting language example, these may be a reference to a hash variable with name to object mapping.

The ranking subroutine via batch process 10 may return an integer value that indicates how severe the problem is. Larger (or smaller) values may mean more severe problems. In some implementations, it may not matter what the exact returned value is, but instead whether more severe issues return larger numbers than others may be more interesting. This may allow batch process 10 to rank the problems that are determined 302 to exist. For example:

```
sub Severity( )
{
    my ($oldvalue, $newvalue, $oldvalues, $newvalues, $tunable_parameters) = @_;
    # $fieldname - field name - empty ifs RecordIsProblem being used.
    # $oldvalues - record's old values and any related changing record values
    # $newvalues - records new values (only changed values appear here)
    # $tunable_parameters - a hash reference of tunable parameters.
    #      These values may be set by a user configuration UI and used
    #      to adjust the problem definition.
    my $severity = 0;   # not severe
    #.....calculate how severe this problem is......
    return $severity;
}
```

In the example, if batch process 10 calls the subroutines for FieldIsProblem, the field name may be passed into the fieldname parameter. If the RecordIsProblem is defined, then $fieldname may be empty.

The example TunableParameters section may contain a list of parameters that batch process 10 may use to configure the behavior of the above-noted ProblemDefinition. For instance, a user-interface for configuring the problem definition object may be automatically generated from batch process 10 by this list of parameters, their types and constraints. The parameters may be accessed in the FieldIsProblem and RecordIsProblem definitions and may be used by batch process 10 to configure their logic. For script subroutines, the tunable parameters may be passed by batch process 10 as a mapping of string to object, where the object may contain the value of the tunable parameter. When the RecordIsProblem, FieldIsProblem and Severity attributes are comparisons, the tunable parameters may be accessed by batch process 10 by using shorthand like % parameter_name % where "parameter_name" may be the actual parameter name used in TunableParameters. This may be shorthand for tunable_parameters[parameter_name] value.

In some implementations, batch process 10 may include additional types of automatic editing that user 46 may want to implement based on the business logic that is defined. For instance, an example automatic editing type may generally be defined by three parts, e.g., 1) a list of field types it operates on, which may be, e.g., script-based, list-based, etc.; 2) an operation—the operation to perform on the fields of subsequent (playback) records, which may be, e.g., script based, defined in one-line operations, etc.; 3) a likelihood calculator—this may indicate to batch process 10 how likely it was that user 46 intended this operation. For instance, the calculator value may be a numeric score with high scores winning out. When the user records a change to be played back, batch process 10 may run the calculator and calculate the likelihood user 46 meant this operation. In some implementations, the calculator likelihood score may be expressed as a number greater than 0. In the example, the larger the score, the more likely that user 46 meant this operation. A calculated likelihood score of 0 may indicate that it is known the operation will not work, so this change type may not show up as an option for user 46 to choose as the playback action type. An example of this may be if a remove-prefix change type was defined, and user 46 did not remove text from the beginning of the value, then it is known this is an invalid change type and would return 0.

In some implementations, if multiple "text" based change types are defined by user 46, and user 46 changes a "text" field, each change type may calculate the likelihood score. The change type with the largest score may win out as the presumed change type. That is, the presumed change type may be selected by default by batch process 10.

As another example, a "math edit type" may be defined. There may be choices like "add", "subtract" or "multiply". For instance, one example way this may be used may be to add five days to a field that may keep track of how much time a task may take. When user 46 chooses one of these user defined edit types, batch process 10 may take the "old" value that existed in the record and use the "new" value to either add it to the old value, subtract it from the old value, or multiply it by the current value.

As another example, a "stripping" edit type may be defined. This may be used, e.g., if a set of records existed that had some field tagged with the prefix of REVIEW, and after those records have been reviewed, user 46 may want to simply remove just the word REVIEW from the field (e.g., leaving the rest of the field value intact). The script may take the input of new value (in this example it would be the word being stripped) and since batch process 10 knows the original value, using a regular expression type of logic, may strip off the word REVIEW and store the rest of the original field value.

In some implementations, the at least one problem condition may be organized 304 on a display by batch process 10. There may be potentially large amounts of data being generated during the above-noted problem analysis, and as such, it may be beneficial for the problem report to be organized 304 and displayed to user 46 in a consumable fashion. For example, the problem report to be organized 304 and displayed to user 46 in a single tree-like view, or a flat grid view, or other organization structure capable of carrying out the present disclosure.

In some implementations, the at least one problem condition may be organized 304 on the display based upon, at least in part, at least one of the at least one record that is determined 302 to have the at least one problem condition via the at least one problem definition object due to the change, the at least one problem condition object used to determine 302 the at least one problem condition, and severity of the at least one problem condition.

For example, batch process 10 may classify the problem conditions (e.g., issues) based on what rule (e.g., ProblemDefinition object) was used by batch process 10 to determine 302 the problem condition. As will be discussed below, user 46 may take action on multiple issues, e.g., with the above-noted pointing device, rather than having to fix each record individually. For example, if batch process 10 determined 302 that in fifty records a large block of text in the description field was replaced with a small piece of text, batch process 10 may organize 304 the fifty individual reports of this issue (e.g., one for each record) together as a group and allow the user to reject, ignore, or accept the change en masse.

Figure 6:
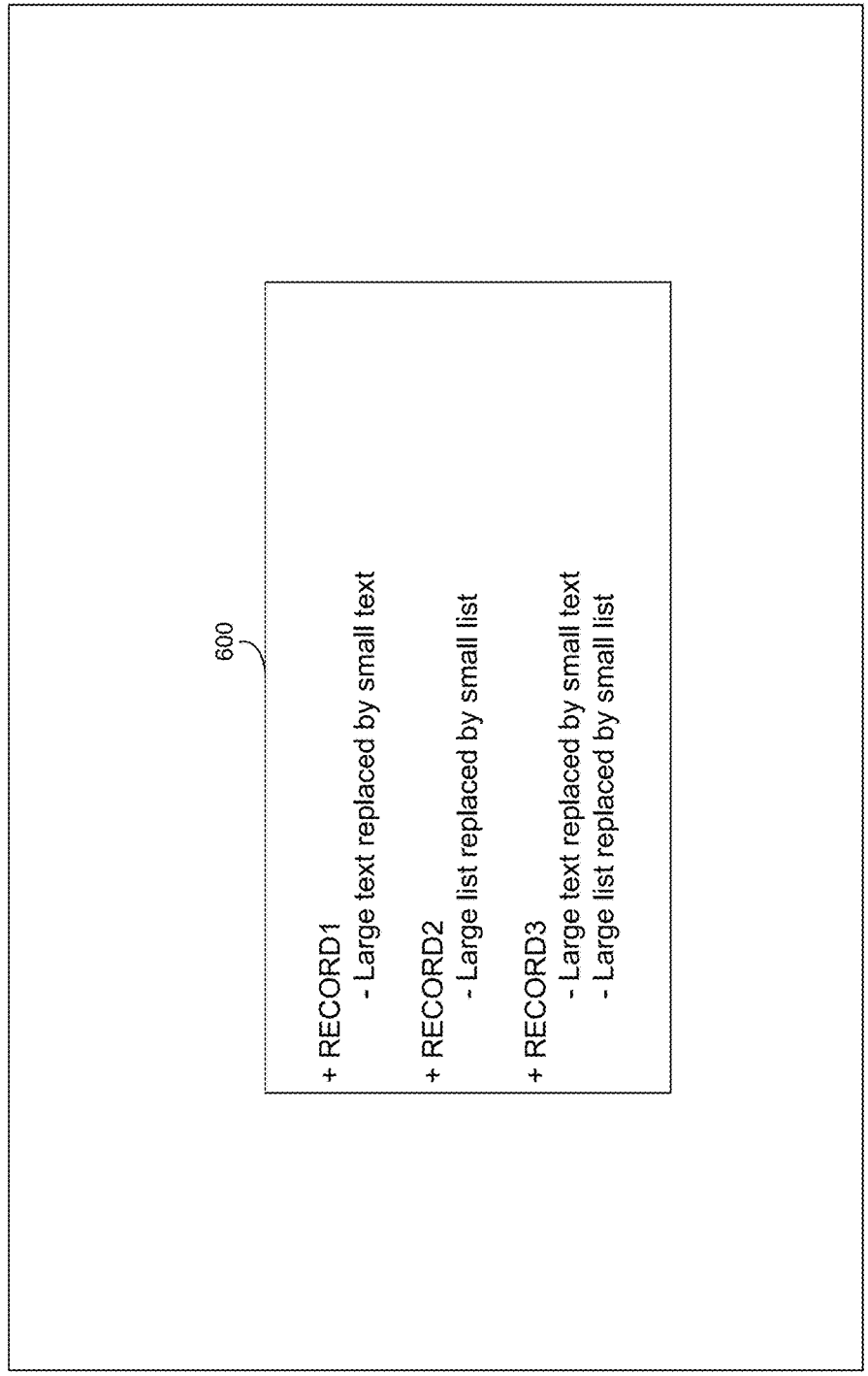
FIG. 6 is an illustrative diagrammatic view of a screen image displayed by the batch process of FIG. 1 according to one or more implementations of the present disclosure.

For instance, and referring also at least to FIG. 6, an example organization of the problem reports is shown on display 212 (from FIG. 2). In the example, batch process 10 may organize 304 the problem report by the record that was being modified and resulted in the determination 302 of a problem condition and triggered the problem report. In the example, each record that triggered a problem condition may have its own node in the tree (e.g., tree 600). In some implementations, when a record is flagged by more than one problem definition, the associated node may have multiple problem reports under it, as is shown by the RECORD3 node. This view may be more useful if the interest is greater for looking at the problems on a record by record basis.

Figure 7:
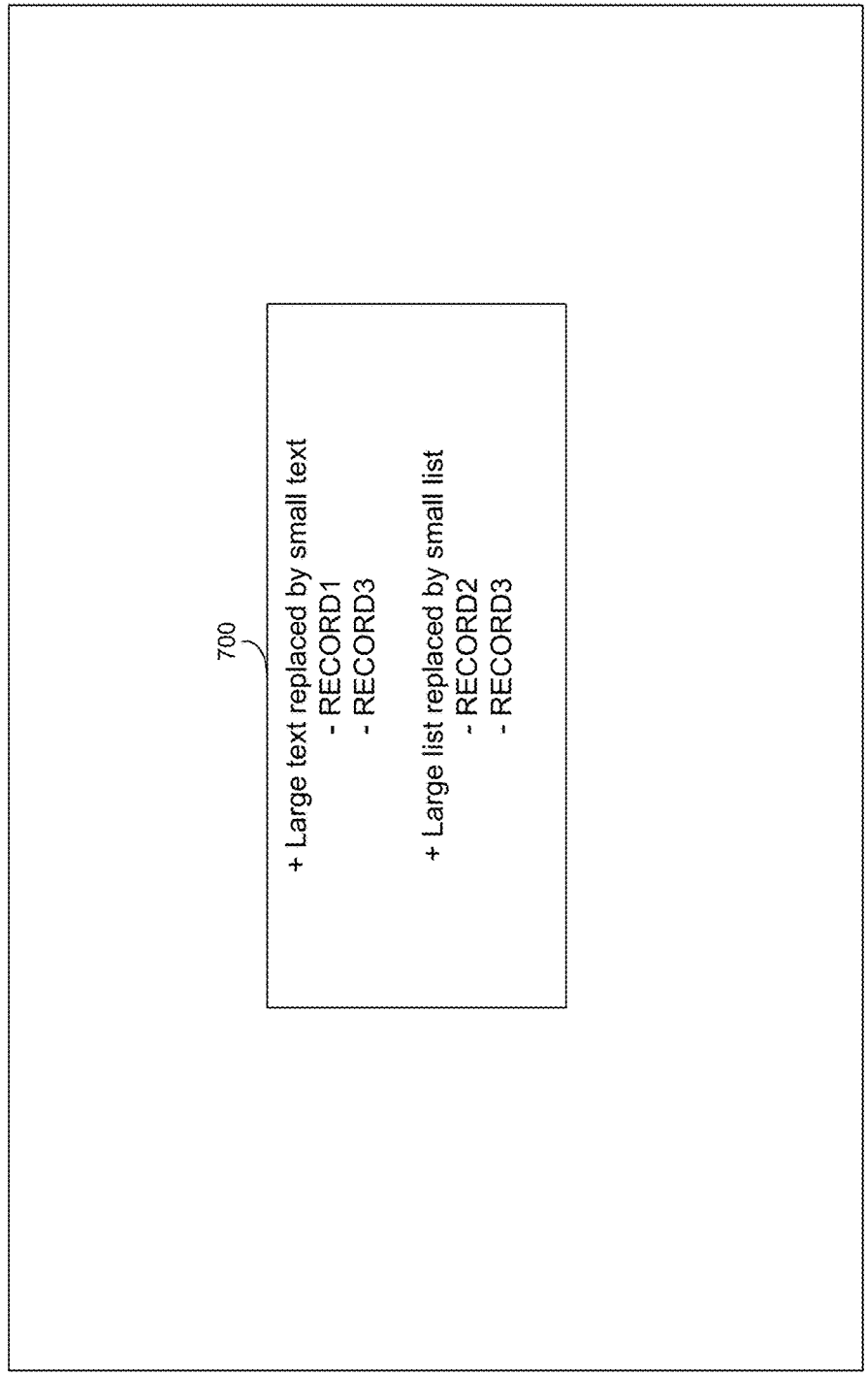
FIG. 7 is an illustrative diagrammatic view of a screen image displayed by the batch process of FIG. 1 according to one or more implementations of the present disclosure.

As another example, and referring also at least to FIG. 7, an example organization of the problem reports is shown on display 212 (from FIG. 2). In the example, batch process 10 may organize 304 the reports based on what rule (e.g., ProblemDefinition object) was used by batch process 10 to determine 302 the problem condition. In the example, each problem definition may have its own node in the tree (e.g., tree 700) at the top level. When user 46 (via batch process 10) expands that node, the records that generated problem reports from this problem definition may be shown. In some implementations, when a record is flagged by more than one problem definition, the associated node may have multiple problem records under it, as is shown by the "Large text replaced by small text" node and the "Large list replaced by small list" node.

This view may be more useful if the interest is greater for looking at the problem conditions one problem condition type at a time. For example, if 100 records triggered an error because a large list was replaced with a small list, and it can be seen that these 100 errors are the only errors in the node for "Large list replaced by small list", and the changes are indeed valid, user 46 may use the user interface to instruct batch process 10 to accept all the flagged changes made for "Large list replaced by small list".

Figure 8:
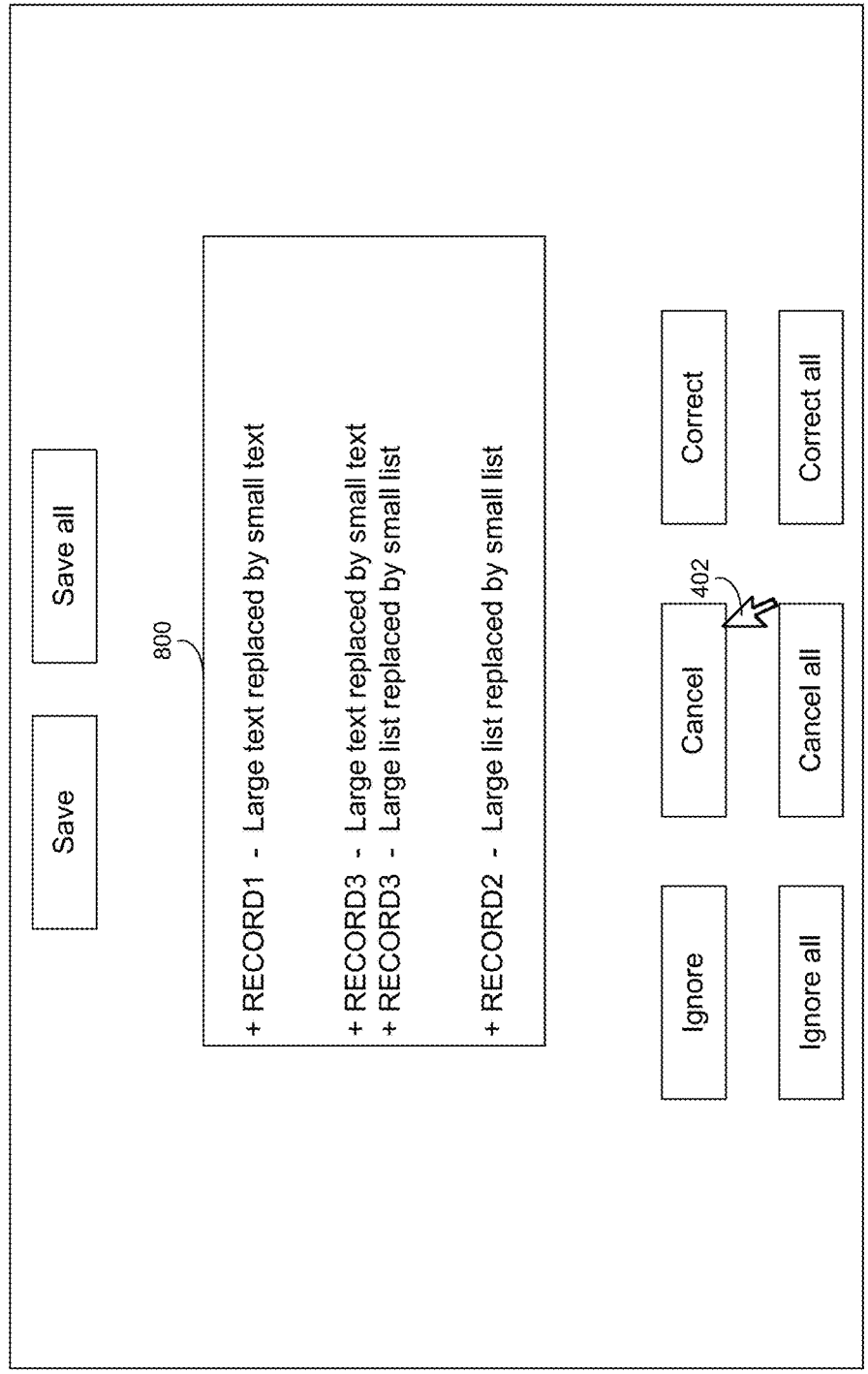
FIG. 8 is an illustrative diagrammatic view of a screen image displayed by the batch process of FIG. 1 according to one or more implementations of the present disclosure.

As another example, and referring also at least to FIG. 8, an example organization of the problem reports is shown on display 212 (from FIG. 2). In the example, batch process 10 may organize 304 the reports by their severity. For example, batch process 10 may rank the problems detected based on a severity of the issue. This may help to prioritize the determined 302 problem conditions. For instance, some problem conditions may be more serious than others. As an example, data loss or corruption may be more serious than where more changes in playback than in the template record are determined 302. The severity may be based on the above-noted problem definition used by batch process 10 to discover the report. In some implementations, within the same problem definition, the report's severity may vary based on the parameters of the change. For example, a problem definition such as the above-noted "Large list replaced by small list" may indicate higher severity if 100 items were replaced than if only 10 items were replaced. In this example view, the problem reports may be at the root level. If "Large text replaced by small text" is more severe than "Large list replaced by small list" for that record, the report may be organized as shown in FIG. 8.

It will be appreciated that other ways of organizing 304 the problem reports may be used without departing from the scope of the disclosure. For example, the reports may be organized 304 by a combination of the above-noted techniques (e.g., organizing the problem reports for the record by severity, organizing by severity inside the problem definition node, etc.). As such, the example organizations should be taken as an example only and not to limit the scope of the present disclosure.

In some implementations, batch process 10 may execute 306 an action on the at least one problem condition displayed. In some implementations, the action may include at least one of ignoring the at least one problem condition, cancelling the change to the at least one record, and correcting the change to the at least one record. For example, as noted above, once user 46 is presented with the list of potential problems detected, user 46 may via batch process 10 be enabled to, e.g., ignore or undo the problems (e.g., thereby hiding them from the display), cancel the changes for the problematic records (e.g., also removing from the display any problems associated with the changes being cancelled), correct them, etc. Batch process 10 may enable user 46 to execute 306 the above-noted actions on an individual basis or en masse as noted above during use of the previously discussed organization 304 techniques in FIGS. 6-8. For instance, user 46 may use cursor 402 to select the desired action to execute 306 by, e.g., selecting individual records, nodes, etc. and selecting the appropriate example objects (e.g., "Ignore", "Ignore all", "Cancel", "Cancel all", "Correct", "Correct all").

For cancelling (e.g., undoing) the changes as the action, the records associated with the selected problem reports may be reverted back to their original (or previous) state. The selected problem reports may also be removed from the view. In some implementations, when the changes to a record are undone (cancelled), any other problem reports for that record may also be removed from the view, even if those problem reports were not selected, since the record is now back in its original state and no longer part of the multi-record update.

For ignoring the changes as the action, the problem reports selected may be removed from the display. In some implementations, user 46 may use the user interface to, e.g., ignore individual problem reports, ignore all problem reports that came from a particular problem definition, or ignore all problem reports associated with a particular record. For correcting (e.g., fixing) the changes as the action, user 46 may use the user interface to, e.g., (via batch process 10) have the ability to edit the records to try and correct the problem. In some implementations, at any time, user 46 may choose to save some or all the changes and ignore/fix some or all the problem reports. In some implementations, the ignored problem reports may be saved (e.g., temporarily) and revisited at a later time by, e.g., using the user interface to select a "View Ignored Problem Reports" object (not shown) or the like.

In some implementations, the correction may be executed 306 by batch process 10 using another multi-record update. In the example, the new multi-record update may be an extension of the first, and may only affect the records that are being corrected. In some implementations, the results of the new multi-record update (including any new problems determined 302) may be included in the current (or alternative) display of the multi-record update and problems. The combined multi-record update may complete once an action is executed 306 upon all problems and the records are saved.

In some implementations, the action may be executed 306 on at least a portion of the at least one problem condition displayed. For example, as noted above, if only one record is selected (e.g., via cursor 402), a display form (e.g., pop-up) may be generated by batch process 10 that enables user 46 to correct the issue. The display form may be the same or similar form that is generally used to edit just one record. In some implementations, the above-noted grid-based editing approach may be used.

As another example, as noted above, if multiple records are selected (e.g., via cursor 402), a new multi-record update may begin. In this example, a new record may be selected to act as a template record on which to identify 300 changes. The new changes may be captured from this record and played back on, e.g., just the records associated with the selected problem reports. Once this has been iterated enough times such that the analysis is complete, the selected problem reports may be hidden or deleted as the user has taken corrective action. However, as user 46 is making more changes to the records, batch process 10 may again look for potential problems. As noted above, the results of the new multi-record update (including any new problems determined 302) may be included in the current (or an alternative window) display of the multi-record update and problems.

In the example, once all problem reports are removed from the view, either by fixing, cancelling, or ignoring (or otherwise), batch process 10 may automatically save the changes. It will be appreciated that any pseudo code described throughout should be taken as an example only and not to limit the scope of the present disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
identifying, by a computing device, a change to at least one record of a plurality of records in a multi-record update;
determining at least one problem condition associated with the change to the at least one record, wherein the at least one problem condition is determined via at least one problem definition object before the change is saved, wherein the at least one problem condition associated with the change to the at least one record is determined by at least one of analyzing the change to the at least one record based upon, at least in part, predefined rules for determining common problems and by allowing a user, via a user interface, to define a set of rules and amend existing problem definitions to detect the at least one problem;
organizing the at least one problem condition on a display, including organizing into a group each of the plurality of records resulting from the change to the at least one record that is determined to be the problem condition defined by the at least one problem definition object;
determining a user intention likelihood score, based on a combination of a change type associated with the change, a user interaction, and the predefined rules; and
executing, based conditionally on the user intention likelihood score, an action on the at least one problem condition displayed for each of the plurality of records organized into the group, wherein executing the action is captured in a single object of data containing information about an order of the one or more changes to the at least one record, wherein the one or more changes is played back in the order in which the user executes the action, wherein the action includes at least one of ignoring the at least one problem condition, cancelling the change to the at least one record, and correcting the change to the at least one record, wherein the action is executed in response to receiving a selection of at least one button in a user interface, wherein the at least one button is associated with at least one of ignoring the at least one problem, cancelling the change, and correcting the change.

2. The computer-implemented method of claim 1 wherein identifying the change to the at least one record includes monitoring changes in a directly selected record of the plurality of records.

3. The computer-implemented method of claim 1 wherein identifying the change to the at least one record includes monitoring changes in a related record of the plurality of records that results from a changed workflow logic.

4. The computer-implemented method of claim 1 wherein the problem definition object is customizable.

5. The computer-implemented method of claim 1 wherein the at least one problem condition is organized on the display based upon, at least in part, at least one of the at least one record that is determined to have the at least one problem condition via the at least one problem definition object due to the change, the at least one problem condition object used to determine the at least one problem condition, and severity of the at least one problem condition.

6. The computer-implemented method of claim 1 wherein the action includes at least one of ignoring the at least one problem condition, cancelling the change to the at least one record, and correcting the change to the at least one record.

7. The computer-implemented method of claim 1 wherein the action is executed on at least a portion of the at least one problem condition displayed.

8. A computer program product residing on a computer readable storage medium having a plurality of instructions stored thereon which, when executed by a processor, cause the processor to perform operations comprising:
identifying a change to at least one record of a plurality of records in a multi-record update;
determining at least one problem condition associated with the change to the at least one record, wherein the at least one problem condition is determined via at least one problem definition object before the change is saved, wherein the at least one problem condition associated with the change to the at least one record is determined by at least one of analyzing the change to the at least one record based upon, at least in part, predefined rules for determining common problems and by allowing a user, via a user interface, to define a set of rules and amend existing problem definitions to detect the at least one problem;
organizing the at least one problem condition on a display, including organizing into a group each of the plurality of records resulting from the change to the at least one record that is determined to be the problem condition defined by the at least one problem definition object;
determining a user intention likelihood score, based on a combination of a change type associated with the change, a user interaction, and the predefined rules; and
executing, based conditionally on the user intention likelihood score, an action on the at least one problem condition displayed for each of the plurality of records organized into the group, wherein executing the action is captured in a single object of data containing information about an order of the one or more changes to the at least one record, wherein the one or more changes is played back in the order in which the user executes the action, wherein the action includes at least one of ignoring the at least one problem condition, cancelling the change to the at least one record, and correcting the change to the at least one record, wherein the action is executed in response to receiving a selection of at least one button in a user interface, wherein the at least one button is associated with at least one of ignoring the at least one problem, cancelling the change, and correcting the change.

9. The computer program product of claim 8 wherein identifying the change to the at least one record includes monitoring changes in a directly selected record of the plurality of records.

10. The computer program product of claim 8 wherein identifying the change to the at least one record includes monitoring changes in a related record of the plurality of records that results from a changed workflow logic.

11. The computer program product of claim 8 wherein the problem definition object is customizable.

12. The computer program product of claim 8 wherein the at least one problem condition is organized on the display based upon, at least in part, at least one of the at least one record that is determined to have the at least one problem condition via the at least one problem definition object due to the change, the at least one problem condition object used to determine the at least one problem condition, and severity of the at least one problem condition.

13. The computer program product of claim 8 wherein the action includes at least one of ignoring the at least one problem condition, cancelling the change to the at least one record, and correcting the change to the at least one record.

14. The computer program product of claim 8 wherein the action is executed on at least a portion of the at least one problem condition displayed.

15. A computing system including a processor and a memory configured to perform operations comprising:
   identifying a change to at least one record of a plurality of records in a multi-record update;
   determining at least one problem condition associated with the change to the at least one record, wherein the at least one problem condition is determined via at least one problem definition object before the change is saved, wherein the at least one problem condition associated with the change to the at least one record is determined by at least one of analyzing the change to the at least one record based upon, at least in part, predefined rules for determining common problems and by allowing a user, via a user interface, to define a set of rules and amend existing problem definitions to detect the at least one problem;
   organizing the at least one problem condition on a display, including organizing into a group each of the plurality of records resulting from the change to the at least one record that is determined to be the problem condition defined by the at least one problem definition object;
   determining a user intention likelihood score, based on a combination of a change type associated with the change, a user interaction, and the predefined rules; and
   executing, based conditionally on the user intention likelihood score, an action on the at least one problem condition displayed for each of the plurality of records organized into the group, wherein executing the action is captured in a single object of data containing information about an order of the one or more changes to the at least one record, wherein the one or more changes is played back in the order in which the user executes the action, wherein the action includes at least one of ignoring the at least one problem condition, cancelling the change to the at least one record, and correcting the change to the at least one record, wherein the action is executed in response to receiving a selection of at least one button in a user interface, wherein the at least one button is associated with at least one of ignoring the at least one problem, cancelling the change, and correcting the change.

16. The computing system of claim 15 wherein identifying the change to the at least one record includes monitoring changes in a directly selected record of the plurality of records.

17. The computing system of claim 15 wherein identifying the change to the at least one record includes monitoring changes in a related record of the plurality of records that results from a changed workflow logic.

18. The computing system of claim 15 wherein the problem definition object is customizable.

19. The computing system of claim 15 wherein the at least one problem condition is organized on the display based upon, at least in part, at least one of the at least one record that is determined to have the at least one problem condition via the at least one problem definition object due to the change, the at least one problem condition object used to determine the at least one problem condition, and severity of the at least one problem condition.

20. The computing system of claim 15 wherein the action includes at least one of ignoring the at least one problem condition, cancelling the change to the at least one record, and correcting the change to the at least one record.

* * * * *